(12) United States Patent
Jannard et al.

(10) Patent No.: US 8,879,161 B2
(45) Date of Patent: Nov. 4, 2014

(54) VARIABLE POWER OPTICAL SYSTEM

(75) Inventors: James H. Jannard, Las Vegas, NV (US); Iain A. Neil, Massagno (CH)

(73) Assignee: Blackeye Optics, LLC, Eastsound, WA (US)

(*) Notice: Subject to any disclaimer, the term of this patent is extended or adjusted under 35 U.S.C. 154(b) by 260 days.

(21) Appl. No.: 13/441,749

(22) Filed: Apr. 6, 2012

(65) Prior Publication Data

US 2012/0281295 A1  Nov. 8, 2012

Related U.S. Application Data

(62) Division of application No. 12/753,536, filed on Apr. 2, 2010, now Pat. No. 8,154,805.

(60) Provisional application No. 61/168,524, filed on Apr. 10, 2009.

(51) Int. Cl.
| G02B 1/06 | (2006.01) |
| G02B 3/12 | (2006.01) |
| G02B 3/14 | (2006.01) |
| G02B 15/00 | (2006.01) |

(52) U.S. Cl.
CPC . *G02B 3/14* (2013.01); *G02B 15/00* (2013.01)
USPC .......................................... 359/666; 359/665

(58) Field of Classification Search
CPC ....... G02B 3/14; G02B 26/005; G02B 26/004
USPC ................................. 359/665, 666
See application file for complete search history.

(56) References Cited

U.S. PATENT DOCUMENTS

| 3,161,718 A | 12/1964 | De Luca et al. |
| 3,366,437 A | 1/1968 | Moriyama et al. |
| 4,407,567 A | 10/1983 | Michelet et al. |
| 4,784,479 A | 11/1988 | Ikemori |
| 4,871,240 A | 10/1989 | Suda |
| 5,315,435 A | 5/1994 | Horiuchi |
| 6,166,864 A | 12/2000 | Horiuchi |
| 6,369,954 B1 | 4/2002 | Berge et al. |
| 6,449,081 B1 | 9/2002 | Onuki et al. |
| 6,459,535 B1 | 10/2002 | Goto |
| 6,538,823 B2 | 3/2003 | Kroupenkine et al. |
| 6,674,473 B1 | 1/2004 | Takada |

(Continued)

FOREIGN PATENT DOCUMENTS

| CN | 1397025 A | 2/2003 |
| CN | 1705901 A | 12/2005 |

(Continued)

OTHER PUBLICATIONS

Final Decision of Rejection in Japanese Application No. 2010-528925 mailed Feb. 4, 2014.

(Continued)

*Primary Examiner* — William Choi
(74) *Attorney, Agent, or Firm* — Knobbe, Martens, Olson & Bear LLP

(57) ABSTRACT

Liquid lens cells are used in a variable power optical system. In one embodiment, a stop is located between a first lens group comprising at least a first liquid lens cell and a second lens group comprising at least a second liquid lens cell. In one embodiment, a liquid lens cell controls an incident angle of light rays on an image surface.

12 Claims, 8 Drawing Sheets

(56) References Cited

U.S. PATENT DOCUMENTS

| | | | |
|---|---|---|---|
| 6,702,483 | B2 | 3/2004 | Tsuboi et al. |
| 6,781,622 | B1 | 8/2004 | Sato et al. |
| 6,906,867 | B2 | 6/2005 | Nagata |
| 6,924,944 | B2 | 8/2005 | Sekiyama |
| 6,934,090 | B2 | 8/2005 | Nagaoka et al. |
| 6,936,809 | B2 | 8/2005 | Viinikanoja |
| 6,950,245 | B2 | 9/2005 | Nishioka et al. |
| 6,952,313 | B2 | 10/2005 | Schrader |
| 6,965,480 | B2 | 11/2005 | Kroupenkine |
| 6,987,529 | B1 | 1/2006 | Ito |
| 6,992,700 | B1 | 1/2006 | Sato et al. |
| 7,006,299 | B2 | 2/2006 | Kroupenkine |
| 7,126,903 | B2 | 10/2006 | Feenstra et al. |
| 7,142,368 | B2 | 11/2006 | Kim et al. |
| 7,218,429 | B2 | 5/2007 | Batchko |
| 7,224,534 | B2 | 5/2007 | Ootsuka |
| 7,227,682 | B2 | 6/2007 | Caldwell et al. |
| 7,230,771 | B2 | 6/2007 | Kuiper et al. |
| 7,253,966 | B2 | 8/2007 | Saori |
| 7,265,911 | B2 | 9/2007 | Goosey, Jr. et al. |
| 7,317,580 | B2 | 1/2008 | Kogo et al. |
| 7,382,545 | B2 | 6/2008 | Jung et al. |
| 7,408,717 | B2 | 8/2008 | Renders et al. |
| 7,413,306 | B2 | 8/2008 | Campbell |
| 7,466,493 | B2 | 12/2008 | Kim et al. |
| 7,855,838 | B2 | 12/2010 | Jannard |
| 8,027,096 | B2 | 9/2011 | Feng et al. |
| 8,154,805 | B2 | 4/2012 | Jannard et al. |
| 8,169,709 | B2 | 5/2012 | Jannard et al. |
| 8,638,496 | B2 | 1/2014 | Jannard et al. |
| 8,687,281 | B2 | 4/2014 | Jannard et al. |
| 8,773,766 | B2 | 7/2014 | Jannard et al. |
| 2002/0176148 | A1 | 11/2002 | Onuki et al. |
| 2004/0021953 | A1 | 2/2004 | Betensky et al. |
| 2005/0113912 | A1 | 5/2005 | Feenstra et al. |
| 2005/0200973 | A1 | 9/2005 | Kogo et al. |
| 2005/0225877 | A1 | 10/2005 | Tang |
| 2006/0028734 | A1 | 2/2006 | Kuiper et al. |
| 2006/0045504 | A1 | 3/2006 | Zarnowski et al. |
| 2006/0047039 | A1 | 3/2006 | Kato et al. |
| 2006/0067663 | A1 | 3/2006 | Kita |
| 2006/0072019 | A1 | 4/2006 | Stavely et al. |
| 2006/0106426 | A1 | 5/2006 | Campbell |
| 2006/0126190 | A1 | 6/2006 | Berge et al. |
| 2006/0227415 | A1 | 10/2006 | Caldwell et al. |
| 2006/0256429 | A1 | 11/2006 | Obrebski et al. |
| 2007/0041101 | A1 | 2/2007 | Goosey, Jr. et al. |
| 2007/0153399 | A1 | 7/2007 | Hendriks et al. |
| 2007/0247727 | A1 | 10/2007 | Kim |
| 2007/0263293 | A1 | 11/2007 | Batchko et al. |
| 2009/0091844 | A1 | 4/2009 | Jannard |
| 2009/0141352 | A1 | 6/2009 | Jannard |
| 2009/0141365 | A1 | 6/2009 | Jannard et al. |
| 2009/0185281 | A1 | 7/2009 | Hendriks |
| 2010/0259817 | A1 | 10/2010 | Jannard et al. |
| 2011/0058258 | A1 | 3/2011 | Wang et al. |
| 2011/0085244 | A1 | 4/2011 | Jannard |
| 2011/0211262 | A1 | 9/2011 | Craen et al. |
| 2012/0281295 | A1 | 11/2012 | Jannard et al. |
| 2014/0211312 | A1 | 7/2014 | Jannard et al. |

FOREIGN PATENT DOCUMENTS

| | | | |
|---|---|---|---|
| CN | 101208627 A | | 6/2008 |
| CN | 101268399 A | | 9/2008 |
| CN | 101821658 A | | 9/2010 |
| CN | 101836135 A | | 9/2010 |
| CN | 101896850 A | | 11/2010 |
| CN | 102388325 A | | 3/2012 |
| CN | 102388332 A | | 3/2012 |
| CN | ZL 200880110582.1 | | 10/2013 |
| CN | ZL 200880111594.4 | | 2/2014 |
| EP | 2071367 A1 | | 6/2009 |
| EP | 2 208 095 | | 7/2010 |
| EP | 2 217 958 | | 8/2010 |
| EP | 2 217 960 | | 8/2010 |
| IN | 81/7/CHENP/2001 A | | 3/2013 |
| JP | 59-116712 | | 7/1984 |
| JP | 60-254014 | | 12/1985 |
| JP | 63-208817 | | 8/1988 |
| JP | 01-129221 | | 5/1989 |
| JP | 6-160779 | | 6/1994 |
| JP | 09-138345 | | 5/1997 |
| JP | 2001-249261 | | 9/2001 |
| JP | 2003-057410 A | | 2/2003 |
| JP | 2004-312239 | | 11/2004 |
| JP | 2004-333640 | | 11/2004 |
| JP | 2004-356175 | | 12/2004 |
| JP | 2006-064947 | | 3/2006 |
| JP | 2007-094170 | | 4/2007 |
| JP | 2007-121821 | | 5/2007 |
| JP | 2008-170874 | | 7/2008 |
| KR | 10-2005-0059291 A | | 6/2005 |
| KR | 10-2005-0033308 A | | 12/2005 |
| TW | 2004-20910 A | | 10/2004 |
| TW | 200533953 A | | 10/2005 |
| TW | 200632364 A | | 9/2006 |
| TW | 200730911 A | | 8/2007 |
| TW | 200736851 A | | 10/2007 |
| TW | 1437307 | | 5/2014 |
| WO | WO 2004/038480 | | 5/2004 |
| WO | WO 2004/083899 | | 9/2004 |
| WO | WO 2005/069042 | | 7/2005 |
| WO | WO 2006/103290 A1 | | 10/2006 |
| WO | WO 2006/110283 | | 10/2006 |
| WO | WO 2008/010124 A1 | | 1/2008 |
| WO | WO 2009/048725 A1 | | 4/2009 |
| WO | WO 2009/073387 A1 | | 6/2009 |
| WO | WO 2009/073388 A2 | | 6/2009 |
| WO | WO 2010/117628 A2 | | 10/2010 |
| WO | WO 2010/117731 A2 | | 10/2010 |

OTHER PUBLICATIONS

Office Action in Taiwan Application No. 097137750 dated Nov. 7, 2013.
Second Office Action in Australia Application No. 2008331642 dated Apr. 1, 2014.
Notice of Rejection in Japanese Patent Application No. 2010-536971, dated Feb. 4, 2014.
Office Action in European Application No. 0885 235.8 dated Jan. 2, 2014.
Preliminary Notice of First Office Action in R.O.C. Application No. 097146762, dated Mar. 24, 2014.
Office Action in Japanese Patent Application No. 2010-536972, dated Feb. 25, 2014.
Office Action in Australia Application No. 2008331643 dated Feb. 20, 2014.
Office Action in European Application No. 08857959.4 dated Jan. 2, 2014.
Preliminary Notice of First Office Action in R.O.C. Application No. 97146764 dated Apr. 16, 2014.
Office Action in European Application No. 10762108.8 dated Oct. 24, 2013.
Office Action in Chinese Application No. 201080016155.4 dated Feb. 17, 2014.
First Office Action in Japanese Application No. 2012-504699 dated Dec. 10, 2013.
Exam Report in Australian Application No. 2010234888 dated Dec. 4, 2013.
Office Action in Chinese Patent Application No. 201080016154.X dated Jan. 24, 2014.
Office Action in Japanese Application No. 2012-504706 dated Dec. 10, 2013.
International Preliminary Report and Written Opinion on Patentability in PCT Application No. PCT/US2008/084232, dated Jun. 17, 2010.
International Preliminary Report on Patentability and Written Opinion in PCT/US2008/084233, International Publication No. WO 2009/073388 A2), dated Jun. 17, 2010.

(56) References Cited

OTHER PUBLICATIONS

International Preliminary Report on Patentability and Written Opinion of PCT Application No. PCT/US2008/077086, date of mailing Apr. 22, 2010—8 pages.
International Preliminary Report on Patentability in Application No. PCT/US2010/028421 mailed Oct. 20, 2011.
International Preliminary Report on Patentability in PCT/US2010/029069 mailed Oct. 11, 2011.
International Search Report of PCT Application No. PCT/US2008/077086, date of mailing Feb. 2, 2009—7 pages.
International Search Report of PCT Application No. PCT/US2008/084232, date of mailing Feb. 23, 2009—7 pages.
International Search Report of PCT Application No. PCT/US2008/084233, date of mailing Jul. 3, 2009—10 pages.
International Search Report and Written Opinion in PCT/US2010/029069, International Publication No. WO 2010/117731 A2), dated Oct. 26, 2010.
International Search Report of PCT Application No. PCT/US2010/028421, date of mailing Dec. 17, 2010—9 pages.
"Liquid Lens Mass Production", Consumer Electronics Industry, Aug. 30, 2006.
"Liquid Lenses for Camera Phones", Roland Piquepaille's Technology Trends, http://www.primidi.com/2004/12/02.html, Dec. 2, 2004.
"Liquid zoom lenses to be available in camera phones before the end of 2005", Cameras and Imaging, http://www.gizmag.com/go/3922/.
Lyon, "Varioptic to Enforce Liquid Lens Patent Rights", Varioptic Newsletter—Mar. 2004, Mar. 17, 2004.
Neil, Iain A., "Compound zoom lenses", Panavision International, L.P., 2005.
Office Action in Chinese Application No. 200880110582.1 dated Jul. 12, 2011.
Office Action in Chinese Application No. 200880111594.6 dated Jan. 31, 2011.
Office Action in Chinese Patent Application No. 200880111594.6 dated Jan. 20, 2012.
"Optical solution", The Economist Newspaper and The Economist Group, http://www.economist.com/PrinterFriendly.cfm?story id=9571244, Jul. 31, 2007.
OPTO & Laser Europe, "Liquid lenses eye commercial breakthrough", http://optics.org/articles/ole/8/11/2/1, Nov. 2003.
Partial International Search Report of PCT Application No. PCT/US2008/084233, date of mailing Apr. 14, 2009—7 pages.
Written Opinion of PCT Application No. PCT/US2008/077086, date of mailing Feb. 2, 2009—7 pages.
Written Opinion of PCT Application No. PCT/US2008/084232, date of mailing Feb. 23, 2009—6 pages.
Written Opinion of PCT Application No. PCT/US2008/084233, date of mailing Jul. 3, 2009—9 pages.
Zubgy, Leonard, "Liquid Lenses, Small variable-focus fluid lens elements", Dec. 8, 2006.
Office Action in U.S. Appl. No. 12/246,224, issued on Dec. 30, 2009.
Notice of Allowance in U.S. Appl. No. 12/246,224, issued on Aug. 11, 2010.
Office Action in Japanese Application No. 2010-528925 mailed Feb. 19, 2013.
Office Action in European Application No. 08837977.1 dated Sep. 5, 2012.
Response and Amendment in U.S. Appl. No. 12/246,224, dated Apr. 30, 2010.
Notice of Allowance in U.S. Appl. No. 12/969,488, dated Dec. 28, 2011.
Office Action in Chinese Application No. 200880110582.1 dated Feb. 26, 2013.
Exam Report in Australian Application No. 2008311114 dated Jan. 31, 2013.
Final Office Action in U.S. Appl. No. 12/327,651 mailed Sep. 7, 2011.
First Office Action in Australia Application No. 2008331642 dated Mar. 22, 2013.
Office Action in U.S. Appl. No. 12/327,651, dated Jun. 30, 2010.
Office Action in U.S. Appl. No. 12/327,651, dated Mar. 23, 2011.
Examiner Interview Summary in U.S. Appl. No. 12/327,651, dated Jun. 23, 2011.
Examiner Interview Summary in U.S. Appl. No. 12/327,651, dated Aug. 30, 2010.
Examiner Interview Summary in U.S. Appl. No. 12/327,651 dated Jan. 25, 2012.
Office Action in Chinese Application No. 200880111594.6 dated May 13, 2013.
Office Action in Chinese Application No. 200880111594.6 mailed Aug. 27, 2012.
Office Action in U.S. Appl. No. 12/327,651, dated Jan. 29, 2010.
Request for Continued Examination, Amendment, and Applicant Summary of Interview with Examiner in U.S. Appl. No. 12/327,651, dated Nov. 1, 2010.
Response and Amendment in U.S. Appl. No. 12/327,651, electronically filed Apr. 29, 2010 to Office Action dated Jan. 29, 2010.
Office Action in U.S. Appl. No. 12/327,666 dated Feb. 16, 2012.
Applicant Summary of Interview with Examiner in U.S. Appl. No. 12/327,666, dated Sep. 27, 2010.
Examiner Interview Summary in U.S. Appl. No. 12/327,666, dated Aug. 27, 2010.
Examiner Interview Summary in U.S. Appl. No. 12/327,666, dated May 20, 2013.
Office Action in Chinese Application No. 200880118070 dated Jan. 18, 2012.
Examiner Interview Summary in U.S. Appl. No. 12/327,666 dated Jan. 25, 2012.
Restriction Requirement in U.S. Appl. No. 12/327,666 dated Jul. 5, 2011.
Examiner Interview Summary in U.S. Appl. No. 12/327,666 dated Jun. 20, 2012.
First Office Action in Australia Application No. 2008331643 dated Feb. 19, 2013.
Office Action in European Application No. 10762108.8 dated Apr. 10, 2013.
Notice of Allowance in U.S. Appl. No. 12/753,536 dated Dec. 6, 2011.
Office Action in U.S. Appl. No. 12/327,666 dated Jan. 16, 2013.
Second Office Action in Chinese Application No. 200880118070.X dated Jan. 10, 2013.
Office Action in U.S. Appl. No. 12/327,666, dated Sep. 15, 2011.
Office Action in U.S. Appl. No. 12/753,536, dated Apr. 28, 2011.
Response to Restriction Requirement in U.S. Appl. No. 12/753,536, dated Mar. 4, 2011.
Restriction Requirement in U.S. Appl. No. 12/753,536, dated Feb. 2, 2011.
Supplementary European Search Report in European Application No. 10762108.8 mailed Aug. 17, 2012.
Office Action in U.S. Appl. No. 12/753,639 mailed on Dec. 20, 2012.
Interview Summary in U.S. Appl. No. 12/753,639 mailed Jun. 4, 2013.
Supplementary European Search Report in European Application No. 10762153.4 mailed Aug. 17, 2012.
Office Action in Japanese Patent Application No. 2010-536971, dated May 14, 2013.
Office Action in Chinese Patent Application No. 201080016154.X, dated Jun. 6, 2013.
Office Action in Japanese Patent Application No. 2010-536972, dated May 21, 2013.
Office Action in Australia Application No. 20100234963, dated May 24, 2013.
Notice of Allowance in Chinese Application No. 200880118070.X dated Apr. 1, 2013.
Office Action in Chinese Application No. 201080016155.4 dated Jul. 3, 2013.
Office Action in Japanese Application No. 2010-528925 mailed Aug. 20, 2013.
Office Action in European Application No. 08857959.4 dated May 27, 2014.
Notice of Preliminary Rejection in Korean Application No. 10-2010-7009050 dated Jul. 11, 2014.

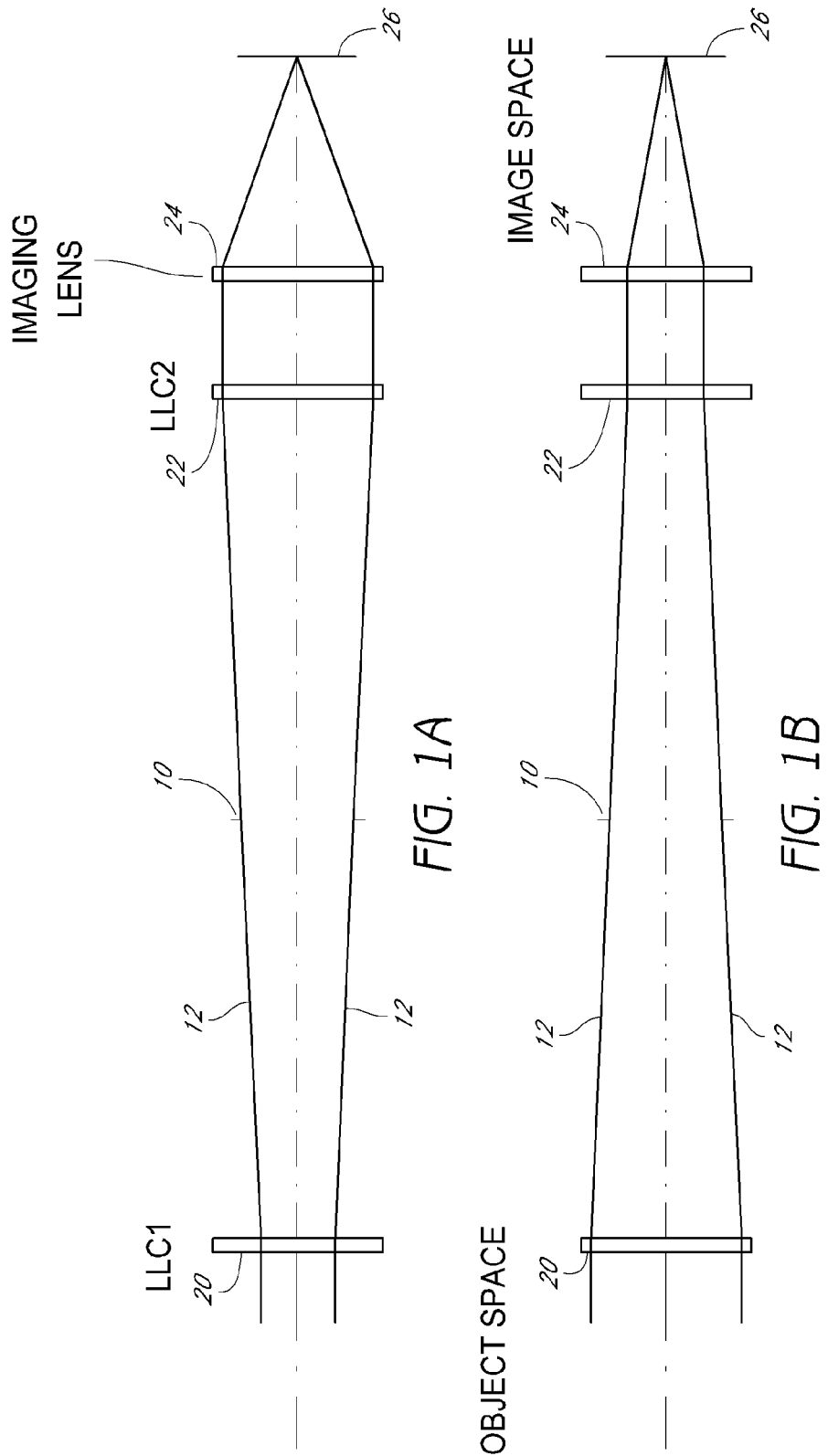

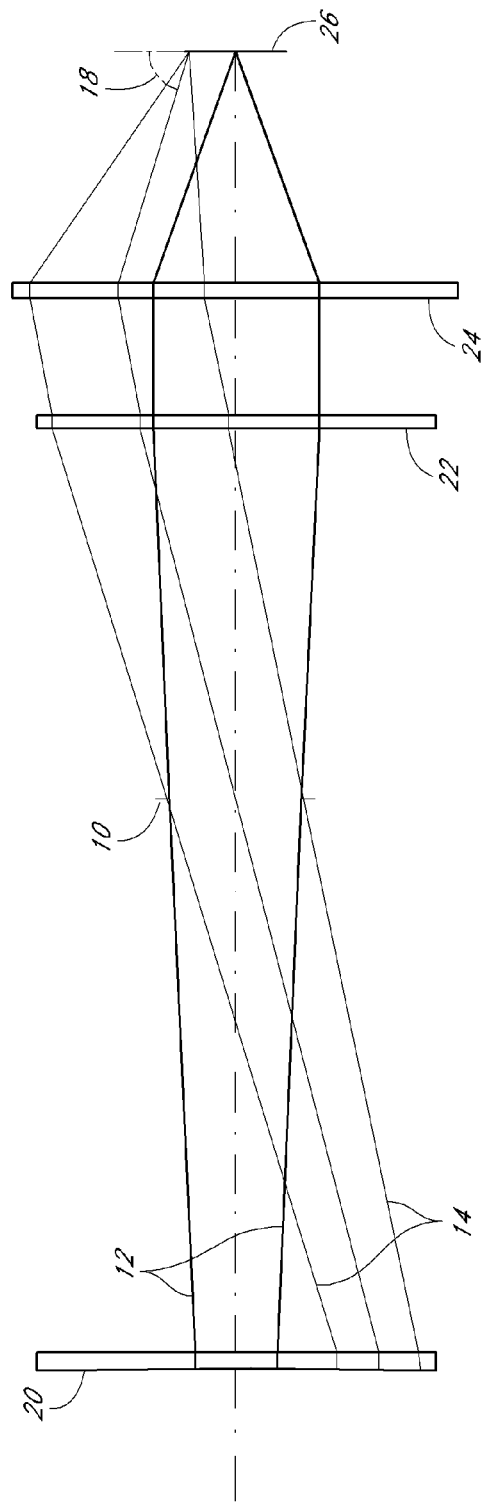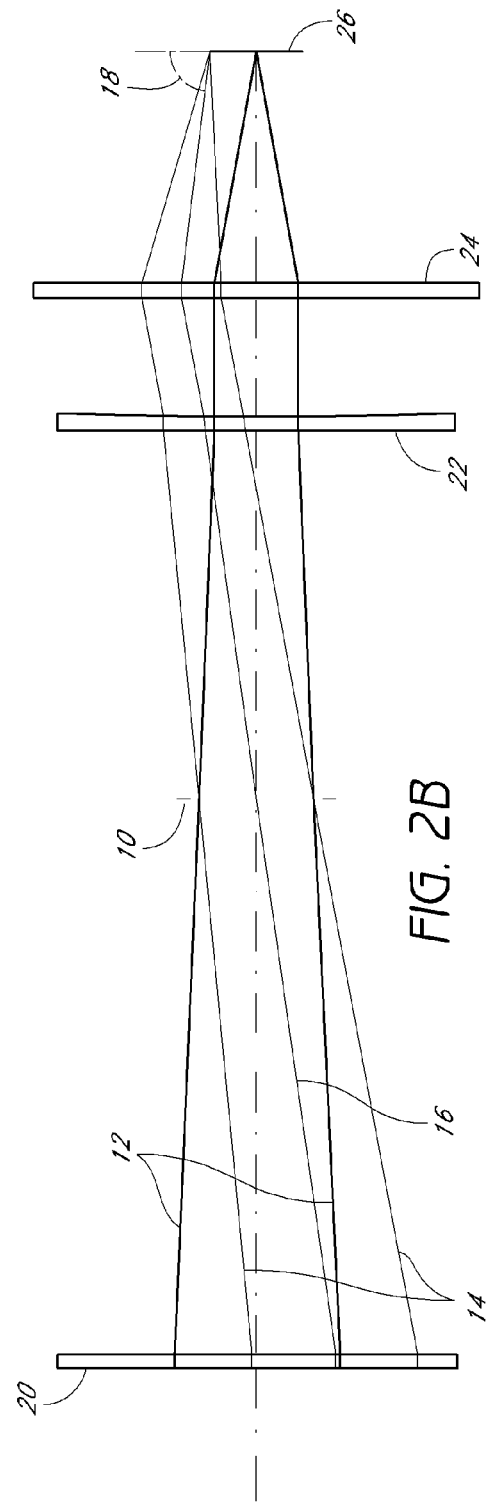
FIG. 2A
FIG. 2B

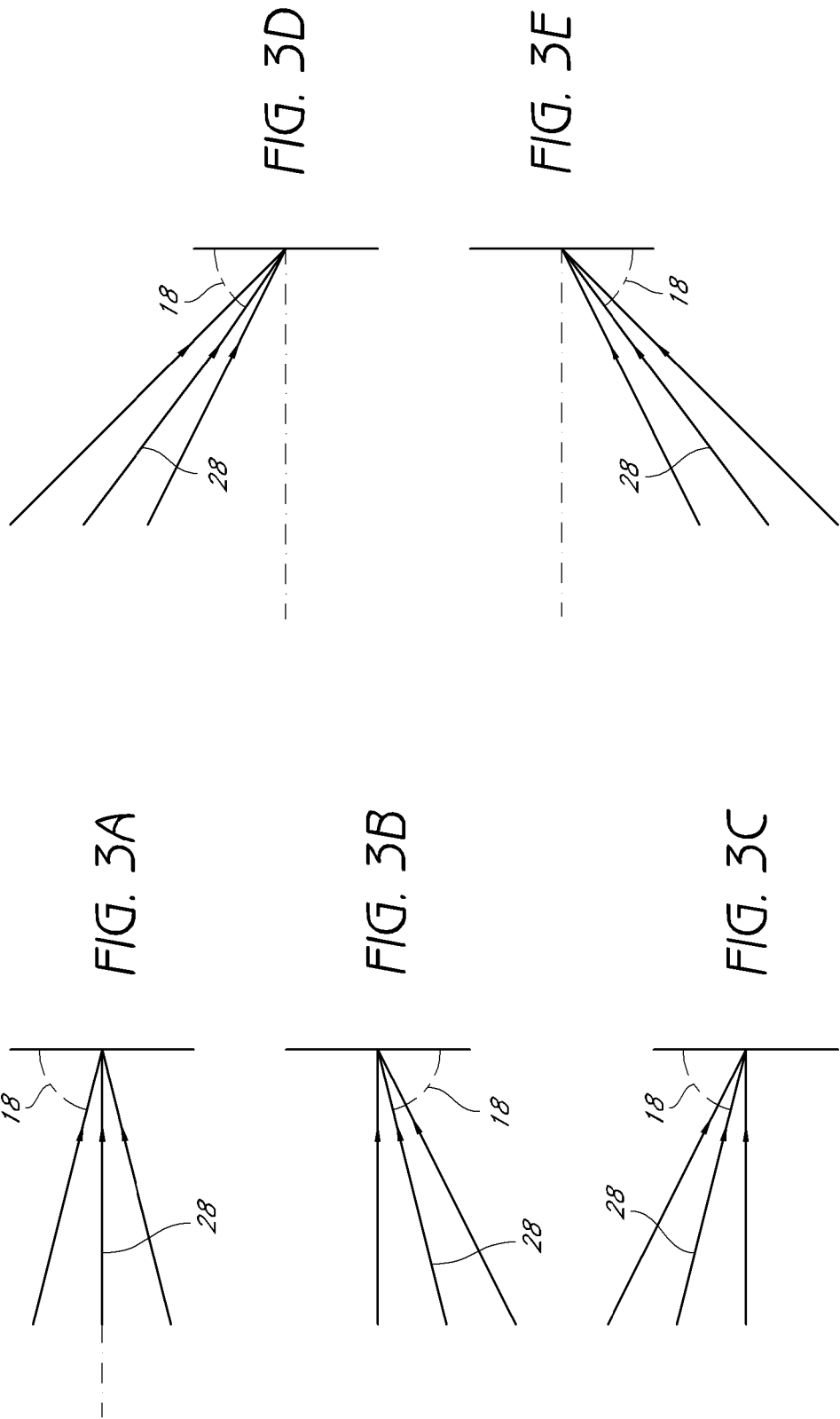

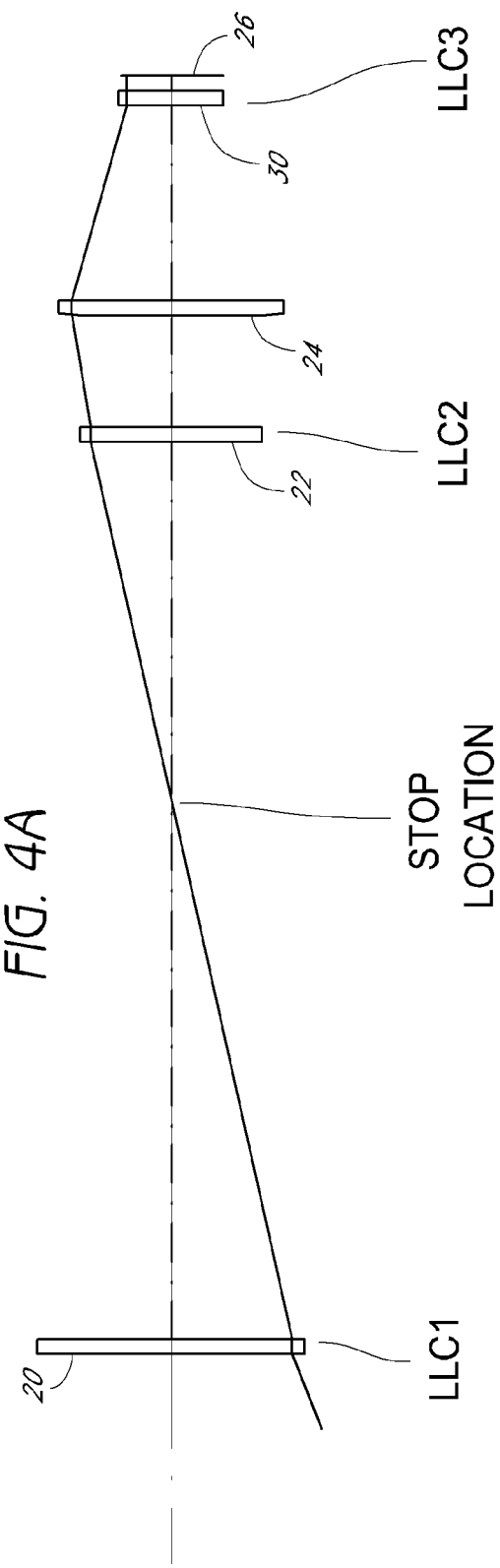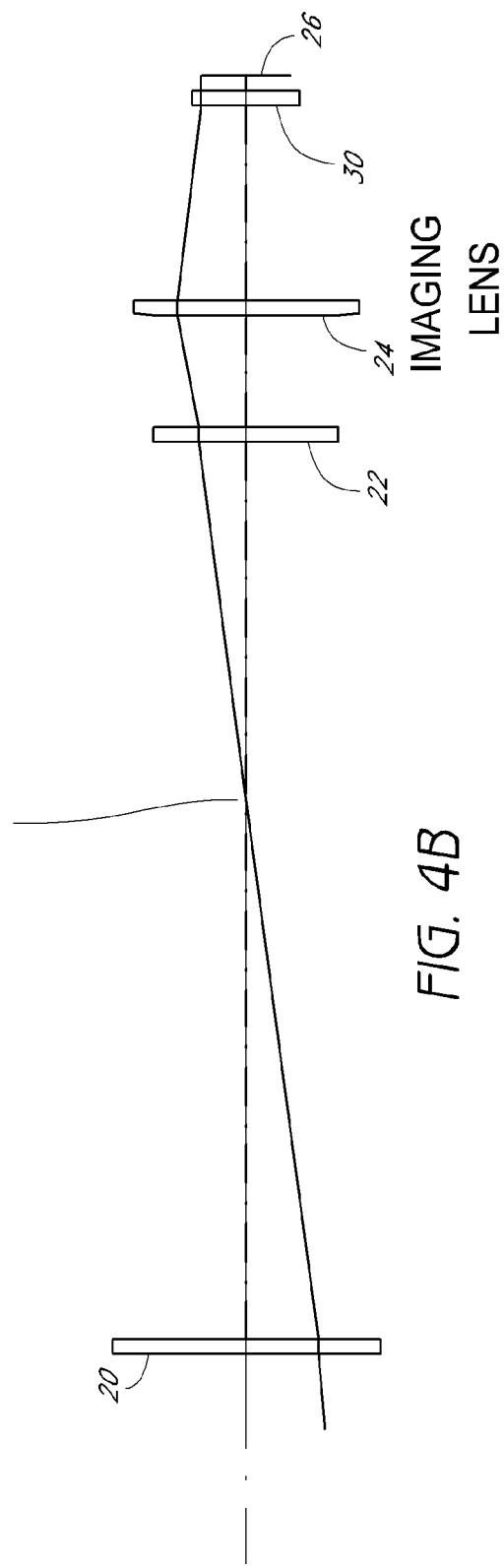

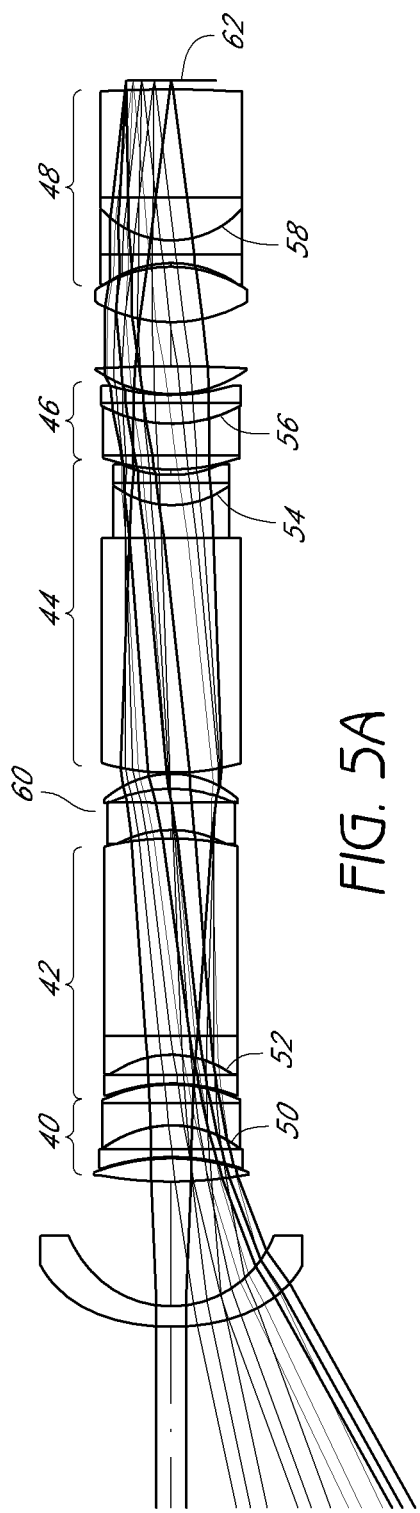
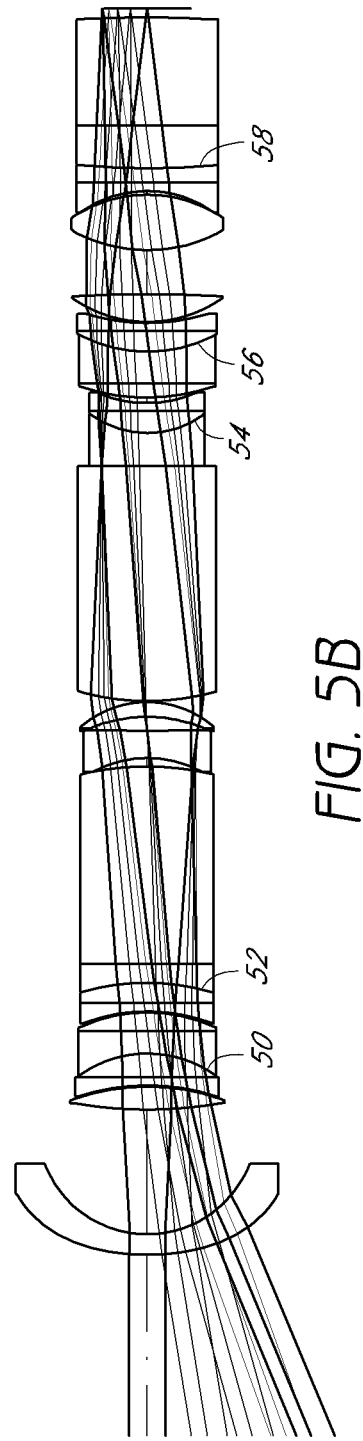
FIG. 5A
FIG. 5B

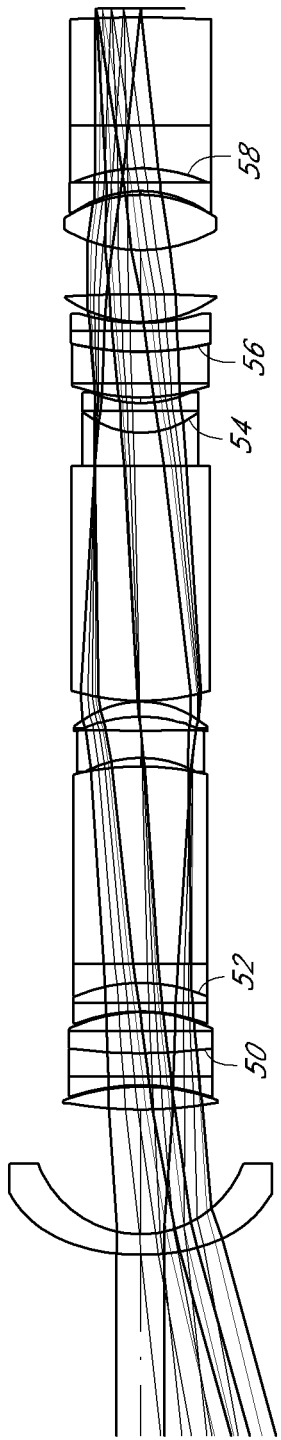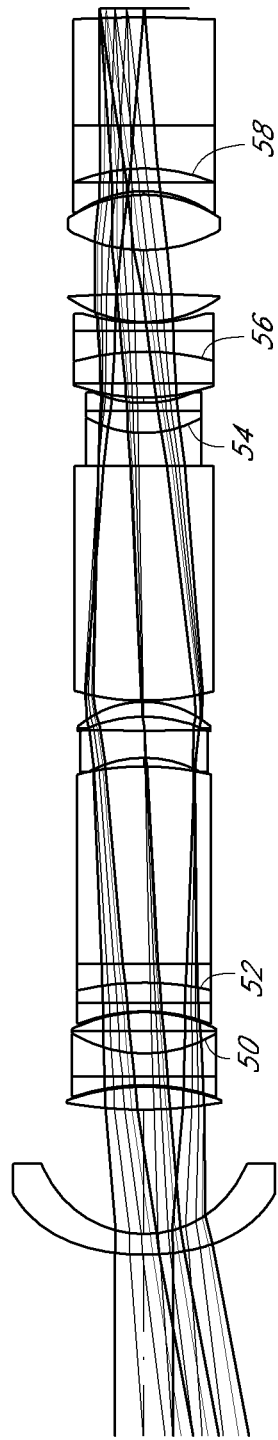

VARIABLE POWER OPTICAL SYSTEM

RELATED APPLICATIONS

This application is a divisional of U.S. application Ser. No. 12/753,536, filed Apr. 2, 2010, which claims priority benefit of U.S. Provisional 61/168,524 filed Apr. 10, 2009. The entirety of each of the foregoing applications are hereby incorporated by reference herein and made a part of the present specification.

BACKGROUND

The present invention relates to a variable power optical system employing liquid optics.

A zoom lens will often have three or more moving lens groups to achieve the zoom and focusing functions. A mechanical cam may link two movable lens groups to perform zooming, and a third movable lens group may be used for focus.

The zoom range is determined in part by the range of movement for the movable lens elements. Greater zoom ranges may require additional space for movement of the lens elements.

Image sensors, such as charge coupled device (CCD) sensors and CMOS image sensors (CIS) collect light using a small photosensitive area such as a photodiode. The image sensors may use micro-lenses to improve photosensitivity by collecting and focusing light from a large light collecting area. The incident angle of light reaching the micro-lens or photosensitive area affects the amount of light collected by the photosensitive area, with light that is received at some angles being less likely to reach the photosensitive area than light that is received at other angles.

Ideally, the incident angle of light at the photosensitive area is constant. However, as a zoom lens varies the focal length, the incident angle of light may change. Thus, moving a lens through the range of zoom positions may result in undesirable results as the incident angle changes.

SUMMARY

A variably power optical component may be used to minimize variations in the incident angle of light on an image surface.

In one embodiment, a variable power optical system comprises a first lens group with at least a first liquid lens cell, a second lens group with at least a second liquid lens cell, and a third liquid lens cell configured to control an incident angle of light rays on a sensor. The control of a zoom position is substantially based at least in part on the configuration of the optical power of the first liquid lens cell and the configuration of the optical power of the second liquid lens cell. The stop may be approximately equidistant between a first surface of the first lens group and a last surface of the second lens group. A diameter of the first liquid lens cell is about the same as a diameter of the second liquid lens cell. In one embodiment, the zoom range is greater than about 3×. In one embodiment, the zoom range is greater than about 4×. In one embodiment, the zoom range is greater than about 5×.

In one embodiment, an optical system is arranged to collect radiation emanating from an object space and deliver radiation to an image surface in an image space along a common optical axis. A first variable power optical component that is stationary on the common optical axis comprises at least two liquids with different refractive properties and at least one contact surface between the two liquids. The shape of the contact surface is varied to produce a change of optical power in the variable power optical component, resulting in a variation of a chief ray angle approaching an image point on the image surface. A second variable power optical component comprises at least two liquids with different refractive properties and at least one contact surface between the two liquids. The shape of the contact surface is varied to reduce the variation in the chief ray angle at the image point on the image surface caused by varying the shape of the first variable power optical component. The shape of the first variable power optical component may be varied to provide a zoom and/or a focus function.

In one embodiment, a variable power objective optical system uses no axially moving groups. At least one variable power optical component provides a zoom function comprising at least two liquids with different refractive properties and at least one contact surface between the two liquids. The shape of the contact surface is varied to produce a change of optical power in the variable power optical component. Another variable power optical component comprises at least two liquids with different refractive properties and at least one contact surface between the two liquids. The shape of the contact surface is varied to at least partially compensate for changes in variation of a chief ray angle approaching an image point on the image surface caused by variable power optical component that provides a zoom function.

In one embodiment, a variable power optical system comprises a first lens group with at least a first liquid lens cell, a second lens group with at least a second liquid lens cell, and a stop located between the first lens group and the second lens group. Light rays passing through the first lens group, second lens group, and the stop represent a zoom position, with control of the zoom position based at least in part on the configuration of the optical power of the first liquid lens cell and the configuration of the optical power of the second liquid lens cell. The stop may be approximately equidistant between a first surface of the first lens group and a last surface of the second lens group. The zoom range may be greater than 3× in one embodiment. The zoom range may be greater than 4× in one embodiment. The zoom range may be greater than 5× in one embodiment.

In one embodiment, a variable power objective optical system comprises at least one variable power optical component with at least two liquids with different refractive properties and at least one contact surface between the two liquids. The shape of the contact surface is varied to at least partially compensate for changes in variation of a chief ray angle approaching an image point on an image surface. The variation of the chief ray angle may be caused at least in part by, for example, a zoom function, a focus function, or a combination of a zoom function and a focus function.

BRIEF DESCRIPTION OF THE DRAWINGS

FIGS. 1A and 1B are optical diagrams depicting rim rays for an axial light beam in a variable power optical system employing liquids.

FIGS. 2A and 2B are optical diagrams depicting rim rays for an axial light beam and rims rays for an off-axis field beam in a variable power optical system employing liquids.

FIGS. 3A, 3B, 3C, 3D and 3E illustrate various incident angles of light rays on an image surface.

FIGS. 4A and 4B illustrate use of a liquid lens cell to adjust an incident angle of a light ray on an image surface.

FIGS. 5A, 5B, 5C, 5D and 5E illustrate optical diagrams of an exemplary variable power optical system design.

DETAILED DESCRIPTION

Figure 5E:
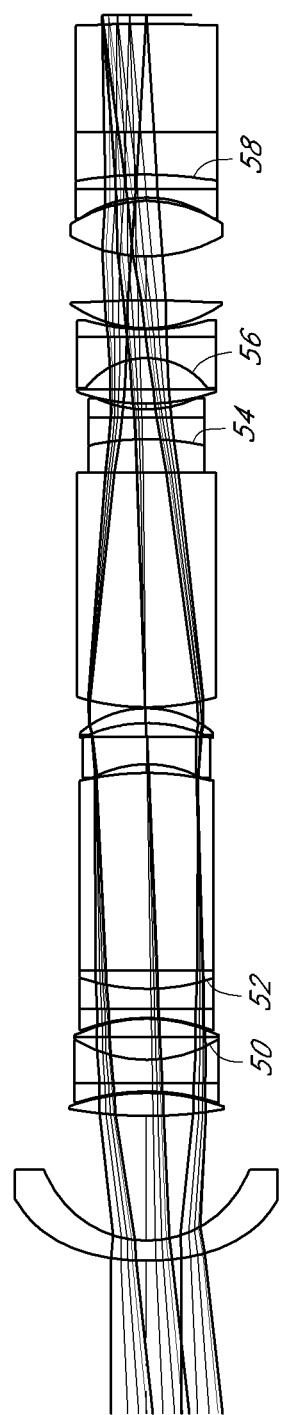

In the following description, reference is made to the accompanying drawings. It is to be understood that other structures and/or embodiments may be utilized without departing from the scope of the invention.

Liquid lens cells can modify an optical path without relying upon mechanical movement of the liquid cell. A liquid lens cell comprising first and second contacting liquids may be configured so that a contacting optical surface between the contacting liquids has a variable shape that may be substantially symmetrical relative to an optical axis of the liquid lens cell. A plurality of lens elements could be aligned along a common optical axis and arranged to collect radiation emanating from an object side space and delivered to an image side space. The liquid lens cell could be inserted into an optical path formed by the plurality of lens elements that are aligned along the common optical axis. The optical axis of the liquid lens cell could be parallel to the common optical axis, or it could be at an angle or decentered to the common optical axis.

Presently contemplated liquid lens systems will have a difference in refractive index of about 0.2 or more, preferably at least about 0.3, and in some embodiments at least about 0.4. Water has a refractive index of about 1.3, and adding salt may allow varying the refractive index to about 1.48. Suitable optical oils may have a refractive index of at least about 1.5. Even by utilizing liquids with higher, lower or higher and lower refractive indices, for example a higher refractive index oil, the range of power variation remains limited. This limited range of power variation usually provides less magnification change than that of a movable lens group. Therefore, in a simple variable power optical system, to provide zooming while maintaining a constant image surface position most of the magnification change may be provided by one movable lens group and most of the compensation of defocus at the image surface during the magnification change may be provided by one liquid cell.

It should be noted that more movable lens groups or more liquid cells, or both, may be utilized. Examples of one or more moving lens groups used in combination with one or more liquid cells is described in U.S. patent application Ser. No. 12/246,224 titled "Liquid Optics Zoom Lens and Imaging Apparatus," filed Oct. 6, 2008, and incorporated by reference in its entirety.

The size and properties of lens elements used in a system introduce constraints to be considered in designing the lens system. For example, the diameter of one or more lens elements may limit the size of an image formed on an image surface. For lens systems with variable properties, such as a variable power optical system, the optics may change based on variation of the lens elements. Thus, a first lens element may constrain a lens system in a first zoom configuration, while a second lens element constrains the lens system in a second zoom configuration. As an example, the rim rays for a light beam may approach the outer edge of a lens element at one extreme of the zoom range, while being a significant distance from the outer edge of the same lens element at the other extreme of the zoom range.

FIGS. 1A and 1B illustrate optical diagrams of a simplified variable power optical system that employs liquid lens cells. The variable power optical system may be used, for example, with a camera. In FIG. 1A, a first liquid lens cell LLC1 20 and a second liquid lens cell LLC2 22 are configured so that the zoom ratio is in the wide position. An imaging lens 24 forms the image on an image surface (which is illustrated as an image plane 26) corresponding with a camera pick-up device.

The imaging lens 24 may be a liquid lens cell or other lens type. The rim rays 12 of an axial light beam illustrated in FIG. 1A are near the outer edge of liquid lens cell LLC2 22. Accordingly, the diameter of liquid lens cell LLC2 22 is a limiting factor in the lens design. In FIG. 1B, liquid lens cell LLC1 20 and liquid lens cell LLC2 22 are configured so that the zoom ratio is in the telephoto position. The rim rays 12 of the axial light beam illustrated in FIG. 1B are near the outer edge of liquid lens cell LLC1 20, making the diameter of liquid lens cell LLC1 the limiting factor. Thus, the simplified design illustrated in FIGS. 1A and 1B is optimized to fully take advantage of the area on liquid lens cell LLC1 20 and liquid lens cell LLC2 22 for the rim rays 12 of axial light beams between a range of positions.

Traditional zoom lens systems utilize moving zoom lens groups to achieve different zoom positions. Because the variable power optical system illustrated in FIGS. 1A and 1B utilizes liquid lens cells, moving lens groups are not needed. Instead, a control system may be used to control the variable shape of the contacting optical surface in liquid lens cells LLC1 20 and LLC2 22.

The use of liquid lens cells instead of moving lens groups facilitates placement of the stop 10 between liquid lens cells LLC1 20 and LLC2 22. Because the liquid lens cells LLC1 20 and LLC2 22 are not moving lens groups, there is no concern that stop 10 will interfere with their proper operation. Stop 10 does not need to be equidistant between the liquid lens cells, and placement of the stop can be optimized as needed.

It is to be understood that liquid lens cells LLC1 20 and LLC2 22 could each comprise multiple surfaces, with the surfaces being controllable and/or fixed. In some embodiments, the liquid lens cells illustrated in FIGS. 1A and 1B could comprise a combination of two or more liquid cells. A plate may be placed between the combined cells. The plate may have an optical power that may be set as desired for the design. The liquid lens cells may also have plates on the exterior surfaces. In some embodiments, the plates on the exterior surfaces may provide optical power or a folding function. The plates and other lens elements can be spherical or aspherical to provide improved optical characteristics.

The individual lens elements may be constructed from solid-phase materials, such as glass, plastic, crystalline, or semiconductor materials, or they may be constructed using liquid or gaseous materials such as water or oil. The space between lens elements could contain one or more gases. For example normal air, nitrogen or helium could be used. Alternatively the space between the lens elements could be a vacuum. When "Air" is used in this disclosure, it is to be understood that it is used in a broad sense and may include one or more gases, or a vacuum. The lens elements may have coatings such as an ultraviolet ray filter.

FIGS. 2A and 2B illustrate additional optical diagrams of the simplified variable power optical system of FIGS. 1A and 1B, depicting rim rays 12 for an axial light beam and rim rays 14 for an off-axis field beam. The chief ray 16 of the off-axis field beam crosses the optical axis at the stop location 10, the stop location indicated by tick marks external to the rim rays. As illustrated, the incident angle 18 of the chief ray 16 of the off-axis field beams on the image plane 26 changes as the zoom lens changes from the wide position to the telephoto position.

The angle of incidence is important because it determines, to some extent, the amount of light that reaches an image sensor. An image sensor may use micro-lenses to improve photosensitivity by collecting and focusing light from a large light collecting area. However, if the size and range of incident angles through zoom are too large, the micro-lenses may not be able to direct the light to the image sensor for efficient sensing through zoom.

Consider FIGS. 3A-3D, which provide exemplary illustrations of light reaching an image sensor. In FIG. 3A, the incident angle 18 of the chief light ray 28 is perpendicular to the image sensor, allowing a micro-lens to successfully direct the light rays to the image sensor. FIGS. 3B and 3C also have small variances of incident angles 18. The micro-lens array could be shifted to form an optimized micro array of lenses, allowing successful redirection of the light rays to the image sensor. FIGS. 3D and 3E have larger variances in, and size of, the incident angles 18, making it more difficult for a micro-lens to direct the rays to the image sensor.

Because the incident angle 18 of the chief light ray 28 changes as the variable power optical system changes from the wide position to the telephoto position, it is possible that the incident angle 18 for one zoom position could be as illustrated in FIG. 3B, while the incident angle 18 for another zoom position could be as illustrated in FIG. 3C. However, it may be desirable to reduce the variations of the incident angle 18.

FIGS. 4A and 4B illustrate optical diagrams where a liquid lens cell LLC3 30 is placed near the image sensor. As the variable power optical system moves through the zoom range, the optical power of the liquid lens cell LLC3 also varies. The variable optical power of the liquid lens cell LLC3 30 allows minimization of the variance in, and size of, the incident angle on the image surface throughout the zoom range. For example, in one embodiment, the liquid lens cell LLC3 provides for the incident angle to be less than 10° from perpendicular to the image plane 26. In another embodiment, the liquid lens cell LLC3 provides for the incident angle to be less than 5° from perpendicular.

Although FIGS. 4A and 4B illustrate lens 30 as a liquid lens cell, other types of lenses may also be used. Lengthening the overall variable power optical design may allow a standard lens to be used instead of a liquid lens cell.

The length of the variable power optical system depends, in part, on the range of optical powers provided by the liquid lens cells. The length of the lens can be minimized by utilizing liquid lens cells that have a high index difference of the liquids. The length of the lens may also be minimized by utilizing multiple liquid lens cells and/or folding.

For simplification, FIGS. 1A, 1B, 2A, 2B, 4A and 4B show lens elements as plates which contain optical power. It is to be understood that the lens elements could be comprised of multiple components with different lens materials and/or optical surfaces.

FIGS. 5A-5E illustrate optical diagrams of an exemplary variable power optical design. FIG. 5A illustrates the wide position, and FIG. 5E illustrates the telephoto position. FIGS. 5B-5D illustrate the intermediate zoom positions. Infinity focus is used for all the zoom positions illustrated in FIGS. 5A-5E.

This variable power optical design utilizes five liquid lens cells 40, 42, 44, 46 and 48, with each liquid lens cell having a variable surface 50, 52, 54, 56, and 58. The lens group near the object space includes two liquid lens cells 40, 42 and is used to primarily assist in providing focus and zoom. The variable power optical design also includes two liquid cells 44, 46 that are used to primarily assist in providing zoom. In the illustrated embodiment, the stop 60 is between the lens group comprising liquid lens cells 40, 42 and the lens group comprising liquid lens cells 44, 46. The variable power optical design also includes a liquid lens cell 48 which partly provides for control of the incident angle at the image plane 62.

In combination all five liquid lenses together provide control of focus, zoom and the incident angle of the chief ray of the off-axis field beams on the image plane as the variable power optical system changes from the wide position to the telephoto position and from infinity focus to close focus.

As illustrated in FIGS. 5A-5D, the optical power provided by variable surface 54 remains fairly constant, and only changes significantly in FIG. 5E. This illustrates that if the zoom positions are limited to the range shown in FIGS. 5A-5D, liquid lens cell 44 could be replaced with a fixed lens element. Accordingly, the number of liquid lens cells could vary with the design requirements.

For the lens design shown in FIGS. 5A-5E, a listing produced by the CodeV optical design software version 9.70 commercially available from Optical Research Associates, Pasadena, Calif. USA is attached hereto as part of this specification and incorporated by reference in its entirety.

Figure 6:
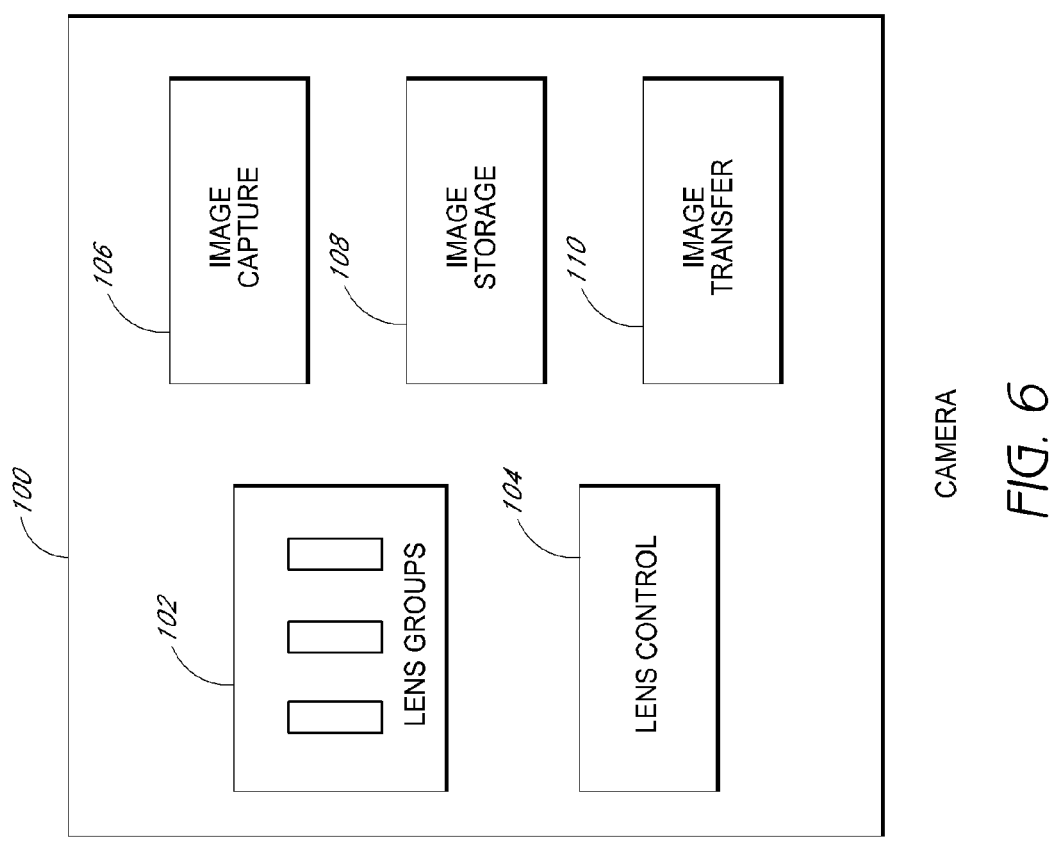
FIG. 6 is a block diagram of a camera.

FIG. 6 illustrates a block diagram of a camera 100 with a variable power optical system 102. FIG. 6 also illustrates a lens control module 104 that controls the movement and operation of the lens groups in optical system 102. The control module 104 includes electronic circuitry that controls the radius of curvature in the liquid lens cells. The appropriate electronic signal levels for various focus positions and zoom positions can be determined in advance and placed in one or more lookup tables. Alternatively, analog circuitry or a combination of circuitry and one or more lookup tables can generate the appropriate signal levels. In one embodiment, a polynomial is used to determine the appropriate electronic signal levels. Points along the polynomial could be stored in one or more lookup tables or the polynomial could be implemented with circuitry. The lookup tables, polynomials, and/or other circuitry may use variables for zoom position, focus position, temperature, or other conditions.

Thermal effects may also be considered in the control of the radius of curvature of surface between the liquids. The polynomial or lookup table may include an additional variable related to the thermal effects.

The control module 104 may include preset controls for specific zoom settings or focal lengths. These settings may be stored by the user or camera manufacturer.

FIG. 6 further illustrates an image capture module 106 that receives an optical image corresponding to an external object. The image is transmitted along an optical axis through the optical system 102 to the image capture module 106. The image capture module 106 may use a variety of formats, such as film (e.g., film stock or still picture film), or electronic image detection technology (e.g., a CCD array, CMOS device or video pickup circuit). The optical axis may be linear, or it may include folds.

Image storage module 108 maintains the captured image in, for example, on-board memory or on film, tape or disk. In one embodiment, the storage medium is removable (e.g., flash memory, film canister, tape cartridge or disk).

Image transfer module 110 provides transferring of the captured image to other devices. For example, the image transfer module 110 may use one or a variety of connections such as, for example, a USB port, IEEE 1394 multimedia connection, Ethernet port, Bluetooth wireless connection, IEEE 802.11 wireless connection, video component connection, or S-Video connection.

The camera 100 may be implemented in a variety of ways, such as a video camera, a cell phone camera, a digital photographic camera, or a film camera.

The liquid cells in the focus and zoom groups could be used to provide stabilization, as described in U.S. patent application Ser. No. 12/327,666 titled "Liquid Optics Image Stabilization," filed Dec. 3, 2008, and incorporated by reference in its entirety. By using non-moving lens groups, folds may be used to reduce the overall size as described in U.S. patent application Ser. No. 12/327,651 titled "Liquid Optics with Folds Lens and Imaging Apparatus," filed Dec. 3, 2008, and incorporated by reference in its entirety. One or more moving lens groups may be used in combination with one or more liquid cells as described in U.S. patent application Ser. No. 12/246,224 titled "Liquid Optics Zoom Lens and Imaging Apparatus," filed Oct. 6, 2008, and incorporated by reference in its entirety.

It is to be noted that various changes and modifications will become apparent to those skilled in the art. Such changes and modifications are to be understood as being included within the scope of the invention as defined by the appended claims.

What is claimed is:

1. A variable power optical system, comprising:
a first lens group, wherein the first lens group comprises at least a first liquid lens cell;
a second lens group, wherein the second lens group comprises at least a second liquid lens cell; and
a stop located between the first lens group and the second lens group,
wherein light rays passing through the first lens group, second lens group, and the stop represent a zoom position, with control of the zoom position based at least in part on the configuration of the optical power of the first liquid lens cell and the configuration of the optical power of the second liquid lens cell,
wherein the zoom range is greater than about 3×.

2. The variable power optical system of claim 1, wherein the stop is approximately equidistant between a first surface of the first lens group and a last surface of the second lens group.

3. The variable power optical system of claim 1, wherein a diameter of the first liquid lens cell is about the same as a diameter of the second liquid lens cell.

4. The variable power optical system of claim 1, wherein the zoom range is greater than about 4×.

5. The variable power optical system of claim 1, wherein the zoom range is greater than about 5×.

6. The variable power optical system of claim 1, wherein an optical power of the first liquid lens cell is varied to provide a focus function.

7. The variable power optical system of claim 1, wherein the variable power optical system does not include any axially movable lens elements.

8. The variable power optical system of claim 1, wherein a change in the optical power of the first liquid lens cell results in a variation of a chief ray angle approaching an image point on an image surface and a change in the optical power of the second liquid lens cell reduces the variation in the chief ray angle at the image point on the image surface.

9. The variable power optical system of claim 8, wherein the second lens group is placed near the image surface and is the last optical component that substantially affects the chief ray angle.

10. The variable power optical system of claim 8, wherein the image surface is formed in the vicinity of at least one micro-lens configured to collect and focus light onto a photosensitive area.

11. The variable power optical system of claim 8, wherein the second lens group is configured to reduce the chief ray angle to be less than 10° from perpendicular to the image surface.

12. The variable power optical system of claim 11, wherein the second lens group is configured to reduce the chief ray angle to be less than 5° from perpendicular to the image surface.

* * * * *